Aug. 5, 1947. G. A. HINKLE Re. 22,903

ARTIFICIAL LEG

Original Filed Aug. 1, 1942 3 Sheets-Sheet 1

INVENTOR.
George A. Hinkle
BY
Zolton A. Polaski
ATTORNEY

Aug. 5, 1947. G. A. HINKLE Re. 22,903

ARTIFICIAL LEG

Original Filed Aug. 1, 1942 3 Sheets-Sheet 2

INVENTOR.
George A. Hinkle

BY

Fulton Holochek
ATTORNEY

Aug. 5, 1947. G. A. HINKLE Re. 22,903

ARTIFICIAL LEG

Original Filed Aug. 1, 1942 3 Sheets-Sheet 3

INVENTOR.
George A. Hinkle

BY

Zoltan Polachek
ATTORNEY

Reissued Aug. 5, 1947

Re. 22,903

UNITED STATES PATENT OFFICE 22,903

ARTIFICIAL LEG

George A. Hinkle, New York, N. Y., assignor to C. H. Bennington Mfg. Co., Inc., Hempstead, Long Island, N. Y., a corporation of New York Original No. 2,327,042, dated August 17, 1943, Serial No. 453,163, August 1, 1942. Application for reissue August 12, 1944, Serial No. 549,231

17 Claims. (Cl. 3—2)

This invention relates to new and useful improvements in an automatic knee lock and adjustable length for an artificial leg.

More particularly, the invention proposes to characterize the new artificial leg by the fact that it has a stump engaging thigh portion and a leg member pivotally connected with the thigh portion. A novel arrangement is proposed whereby it is possible for the user of the leg to place his weight on it when moving forwards without any danger of the leg collapsing, and a further arrangement whereby the leg automatically bends when it is moved forwards. With this construction the necessity of swinging a stiff leg sidewise to move it to a front position has been avoided.

Still further the invention contemplates a pendulum actuated means for controlling a bolt which automatically locks the leg when required.

An arrangement is also proposed whereby when any weight is placed on said thigh member and leg member they automatically become locked against bending.

It is an object of a modification of this invention to construct an artificial leg characterized by a stump engaging thigh member and a leg member having their adjacent ends overlapped and pivotally connected together and provided with a means concentric with the pivot point for locking the members together in a manner to carry the wearer's weight when stepping forward with the other leg.

Another object of this invention proposes the provision of a pivotally mounted pendulum arranged in a manner to control the locking and unlocking of the leg members as the person walks.

Still another object of this invention proposes the construction of a device which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
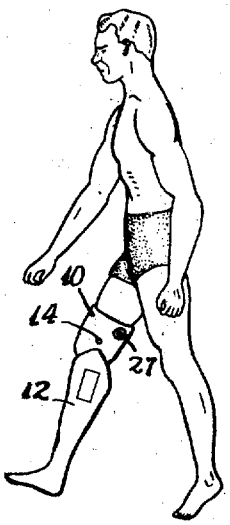
Fig. 1 is an illustration of a man provided with an artificial leg constructed according to this invention.
Figure 3:
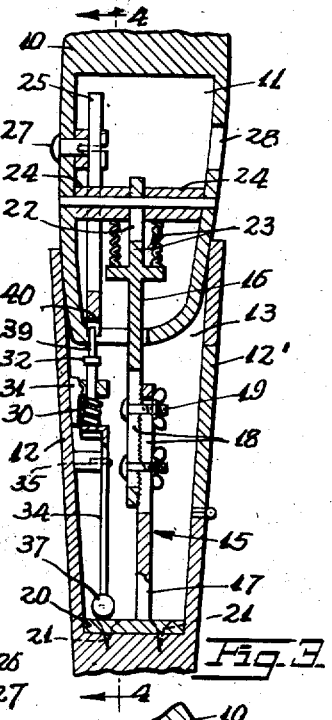
Fig. 3 is a fragmentary sectional view taken on the line 3—3 of Fig. 2.
Figure 2:
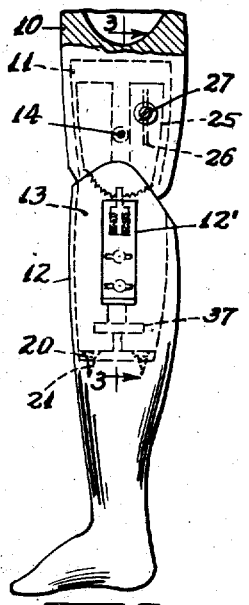
Fig. 2 is an enlarged elevational view of the artificial leg.

The artificial leg, in accordance with this invention, includes a stump engaging thigh member 10 having a hollow 11 in its bottom end. A leg member 12 is associated with the thigh member 10. This leg member has a hollow 13 in its top end. A pintle 14 is mounted across the hollow 11 of the thigh member 10. An adjustable support 15 is mounted within the hollow 13 of the leg member 12 and is pivotally and slidably connected with the pintle 14.

More particularly, the adjustable support 15 is formed from two sections, a top section 16 and a bottom section 17. Each of these sections have their adjacent ends overlapping and formed with slots 18 through which wing clamp screws 19 engage for locking the sections in adjusted positions. The screws 19 are accessible through a door 12' formed in the side of leg member 12. The bottom section 17 is provided with a flange 20 by which it is mounted upon the base of the hollow 13. Fastening members 21 engage through the flange and into the leg member 12 for connecting these parts.

The top section 16 is formed with a slot 22 through which the pintle 14 passes. Resilient means is provided for urging the thigh member 10 and leg member 12 apart. This resilient means comprises several strong springs 23 acting between the top sections 16 of the support 15, and bushings 24 which are pivotally mounted on the pintle 14.

The leg member 12 may be constructed by using a person's good leg for a mold. It is proposed that first an auxiliary mold of rubber be made from the good leg, and then the artificial member 12 may be properly formed from the rubber mold.

A keeper 25 is adjustably mounted within the bottom of the thigh member 10 and has an arcuate serrated bottom 26. This keeper 25 is substantially of U-shape with its arms straddling the pintle 14 and one of the bushings 24. One of the arms of the keeper 25 is formed with an elongated slot 26 by which it is engaged with a clamp screw 27 mounted on one wall of the thigh member 10. The other wall of the thigh member is provided with an opening 28 by which the clamp screw 27 may be manipulated when the keeper 25 is adjusted.

A lock member 29 in the form of a bolt is slidably mounted within the hollow 13 of the leg member 12 and is engageable with the keeper 25 by engaging the serrated bottom 26. This bolt 29 is resiliently urged into a retracted position by a spring 30. A bracket 31 slidably supports the bolt 29. This bracket is mounted upon the wall of the leg member 12. The bolt 29 is provided with a flange 32 which limits downward motion thereof. The spring 30 acts between the bracket 31 and a flange 33 formed on the bolt 29. A pendulum 34 is pivotally supported by a pintle 35. This pendulum has a cam head 36 cooperative with the bottom of the bolt 29 for urging the bolt to engage the serrated bottom 26 when the artificial leg is in a straight condition and directed forwards. The pendulum 34 has a tubular bottom 37 which is weighted with shot 38. The keeper 25 is also formed with a large notch 40 which is engageable by the bolt 29 when the thigh member 10 and leg member 12 are in a straight line with each other.

Figure 6:
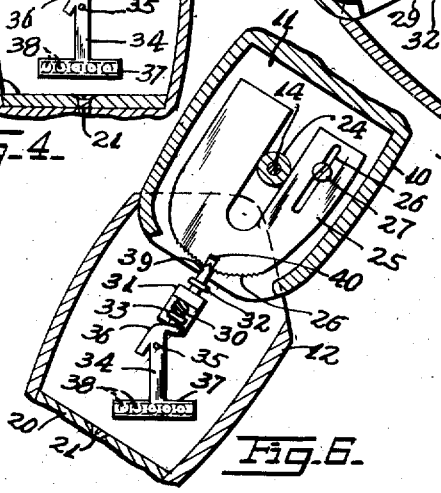
Fig. 6 is another view similar to Fig. 4 but illustrating the parts in still another condition.
Figure 7:
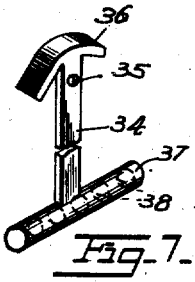
Fig. 7 is a perspective view of the pendulum per se.

The operation of the device may be best understood by first examining Fig. 1 and noting that the artificial leg is now forward with the thigh member 10 and leg member 12 thereof in a straight line with each other. In this condition of the leg, the parts are as shown in Fig. 6. The pendulum 34 is in a position in which the cam 36 has the bolt 29 extended into the notch 40 of the keeper 25. The thigh member 10 and leg member 12 are therefore latched against pivoting. A person may now shift his weight to the artificial leg and move his body and the good leg forwards. When the weight shifts upon the artificial leg, the resilient means 23 will be compressed and there will be a tendency of the thigh member 10 to move downwards relative to the leg member 12 and so maintain the engagement of the notch 40 with the bolt 29.

Figure 4:
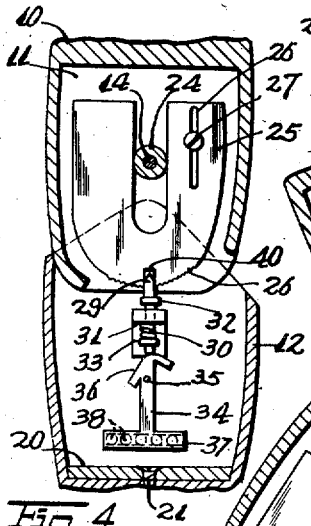
Fig. 4 is a fragmentary enlarged sectional view taken on the line 4—4 of Fig. 3.
Figure 5:
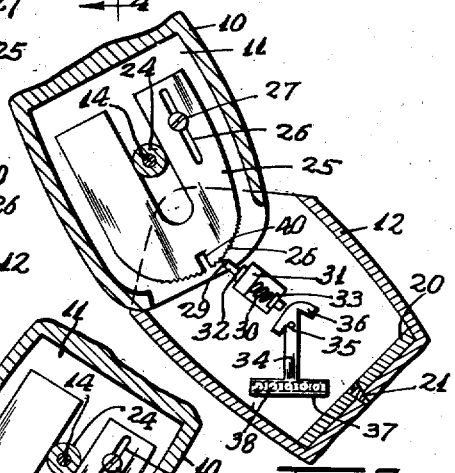
Fig. 5 is a view similar to Fig. 4 but illustrating the parts in a different position.

When the artificial leg reaches a vertical position the parts are still engaged, as illustrated in Fig. 4. However, when the artificial leg starts to assume a rearwardly extended position the cam 36 will reach a position in which the bolt 29 will be lowered. However, the thigh member 10 will then move down correspondingly, as long as there is any weight on the artificial leg and the bolt 29 will either maintain its engagement with the notch 40 or engage an adjacent serration 26 of the keeper 25. Thus the artificial leg will not bend while there is any weight on it.

After the artificial leg has reached a backwardly extending position, the position in which the good leg is in as illustrated in Fig. 1, the person will shift his weight to the forwardly extending good leg and now the artificial leg must be moved to the front. At this instant when the weight is taken off the artificial leg the bolt 29 will disengage from the serrations 25 or the notch 40, and now the artificial leg may bend as it is moved forwards, eliminating the necessity of dragging a stiff leg forwards. When the artificial leg reaches its fully forward extended position the parts will be in the position as previously described relative to Figs. 1 and 6.

The artificial leg, according to the form of the invention shown in Figs. 8 to 14, includes a stump engaging thigh member 50 having a hollow bottom end 51. A leg member 52 having a hollow top end 53 has its top end connected to the bottom end of the stump engaging member 50. More specifically, the bottom end of the stump engaging member 50 is set into the top end of the leg member 52 so that the adjacent ends of these members overlap one another. A pintle 54 is engaged across the overlapping portions of the members 50 and 52 and serves to pivotally connect these members together.

An elongated member 55 has one of its ends concentrically engaged freely upon the pintle 54. The free end of the elongated member 55 is extended downwards into the hollow of the leg member 52. This end is fixedly secured to one wall of the hollow 53 by several screws 56. The top end of the elongated member 55 is formed with a keeper opening 57 adjacent the pintle 54.

A disc 58 is concentrically mounted upon the pintle 54 to one side of the top end of the elongated member 55 and is securely attached to the stump engaging member 55 by a screw 59. The side of the disc 58 adjacent the side of the elongated member 55 formed with the keeper opening 57, is formed with a plurality of peripheral serrations 60.

A pendulum 61 is provided for simultaneously engaging the serrations 60 and the keeper opening 57 for locking the members 50 and 52 against pivoting. The pendulum 61 is characterized by a pendulum arm 62 which is pivotally mounted intermediate of its ends upon the stump engaging member 50 by means of a screw 63. The bottom end of the pendulum arm 62 is extended into the hollow 53 of the leg member 52 and is provided with a large weight 64. The top end of the arm 62 is bent towards the disc 58 and the top end of the elongated member 55 and is enlarged. One side 65 of the top end of the arm 62 is aligned with the serrations 60 of the disc 58, while the other side of the top end of the arm 62 is formed with a projection 66 for engaging the keeper opening 57 in the top end of the elongated member 55.

Figure 8:
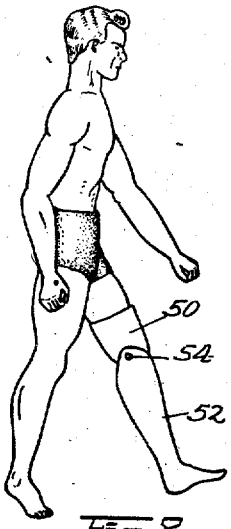
Fig. 8 is an illustration of a man provided with an artificial leg constructed in accordance with a modification of this invention.

The operation of this form of the invention is as follows:

This operation may be best understood by first examining Fig. 8, wherein it will be noted that the artificial leg is now formed with the stump engaging member 50 and the leg member 52 in end alignment with each other. This condition of the parts is illustrated in the sectional view Fig. 12. The weight 64 of the pendulum 61 has the pendulum arm 62 in a position in which the top end of the arm 62 is engaging both the keeper opening 57 and the serrations 60 for locking the leg members 50 and 52 against pivoting. The wearer may now shift his weight to the artificial leg and move his body and good leg forward.

Figure 11:
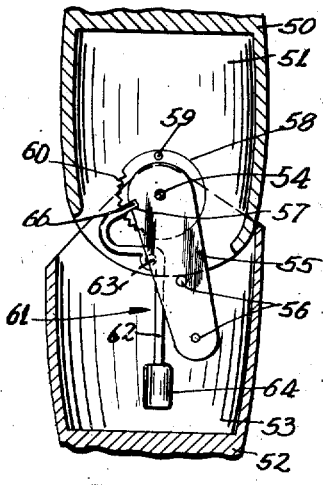
Fig. 11 is a vertical sectional view taken on the line 11—11 of Fig. 10.
Figure 12:
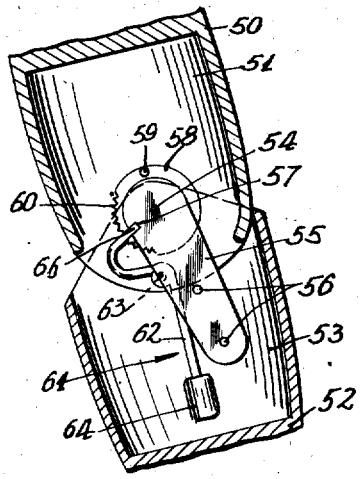
Fig. 12 is a view similar to Fig. 11 but illustrating the parts in a different position.

When the artificial leg reaches a vertical position the leg members 50 and 52 will still be in their locked position as shown in Fig. 11.

Figure 13:
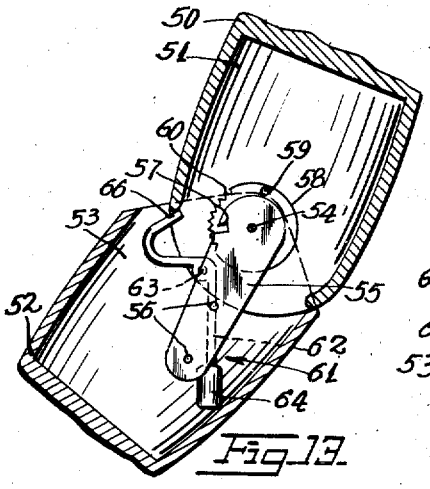
Fig. 13 is another view similar to Fig. 4 but illustrating the parts in still another condition.
Figure 9:
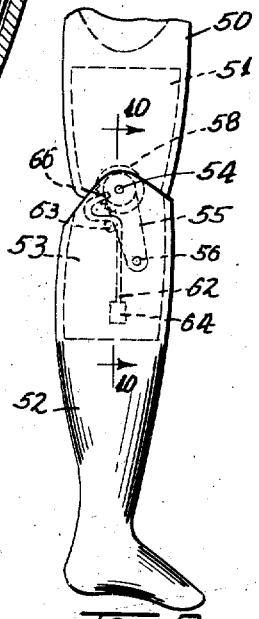
Fig. 9 is an enlarged side elevational view of the leg shown in Fig. 8.
Figure 10:
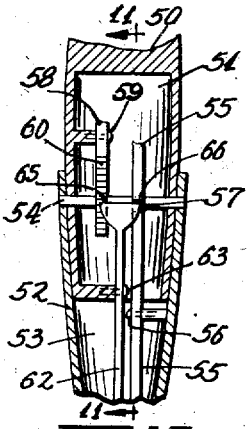
Fig. 10 is a fragmentary vertical sectional view taken on the line 10—10 of Fig. 9.
Figure 14:
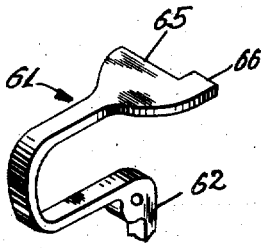
Fig. 14 is a perspective view of the top portion of the pendulum per se.

When the artificial leg has reached a backward extended position, the position in which the good leg is in Fig. 8, the person will shift his weight to the forwardly extending good leg and now the artificial leg must be moved to the front. At this instant the weight 64 will pivot the pendulum arm 62 to assume the position shown in Fig. 13, causing the top end of the arm 62 to be disengaged from the keeper opening 57 and serrations 60. This disengagement will free the members 50 and 52 and now the leg member 52 may bend relative to the stump engaging member 50 as shown in Fig. 13, permitting the artificial leg to be moved directly forwards without the necessity of dragging the stiff leg forwards.

Figure 15:
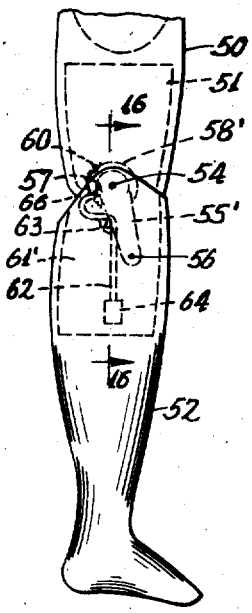
Fig. 15 is a side elevational view similar to Fig. 9, but illustrating a further modification of the invention.
Figure 16:
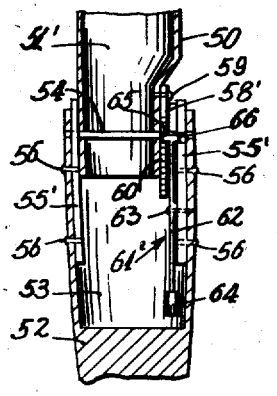
Fig. 16 is a vertical sectional view taken on the line 16—16 of Fig. 15.

In Figs. 15 and 16 another modified form of the invention is shown which distinguishes from the prior form in several respects. In this form of the invention there are two elongated members 55' which are attached with fastening elements 56 upon the inner sides of the hollow 53 of the leg member 52. A pintle 54 passes through the stump engaging member 50 and the leg member 52 and the elongated members 55' for pivotally connecting the stump engaging member 50 and the leg member 42. Moreover, the disc 58' is attached upon the outer face of the stump engaging member 50 and extends into the hollow 53 of the leg member 52. The pendulum 61' is pivotally supported by a pintle 63 and is located within the hollow 53 and outside of the stump engaging member 50. Expressed differently, one of the elongated members 55, the disc 58' and the pendulum 61' are disposed in a space between the adjacent faces of the stump engaging member 50 and leg member 52.

The said latter elongated member 55' is formed with the notch 57 which is engaged by the projection 66 of the pendulum similar to the construction and operation described relative to the prior form of the invention.

Figure 19:
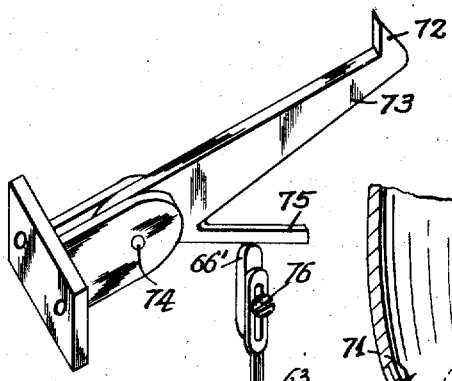
Fig. 19 is a perspective detail view of some of the parts shown in Figs. 17 and 18.
Figure 18:
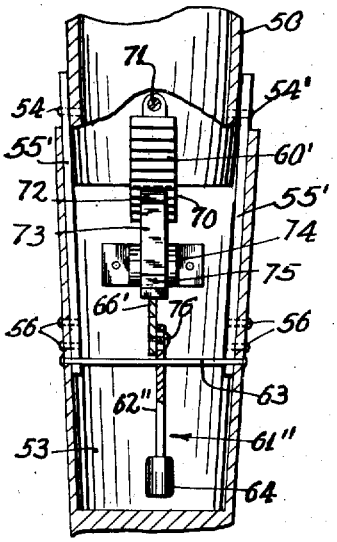
Fig. 18 is a vertical sectional view taken on the line 18—18 of Fig. 17.
Figure 17:
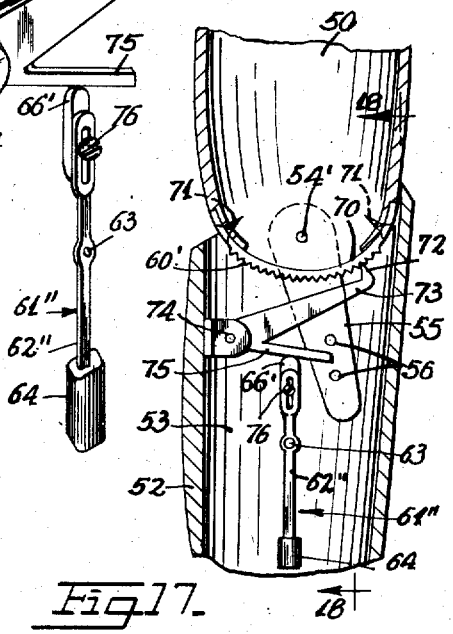
Fig. 17 is a sectional view similar to Fig. 11, but illustrating a still further modification of the invention.

In Figs. 17–19 another modified form of the invention is disclosed in which the elongated members 55' are attached upon the sides of the hollow 53 of the leg member 52. These elongated members 55' extend upwards against the outside faces of the stump engaging member 50 and are pivotally connected therewith by the pintles 54'. An arcuate plate 70 with serrations 60' is attached by the use of fastening elements 71 upon the bottom of the stump engaging member 50. A hook 73 is pivotally mounted by a pintle 74 on a bracket mounted within and upon one wall of the hollow 53 of the leg member 52. This hook 73 is provided with a tooth 72 which engages the serrations 60'. The hook 73 has a tail projection 75 which is engaged by an adjustable member 66' adjustably mounted upon the pendulum 61''. More specifically, the pendulum 61'' is pivotally supported by a pintle 63 which is mounted across the hollow 53. The pendulum 61'' has a rod 62'' which supports the weight 64. The top of the rod 62'' is formed with an elongated slot through which the holding screw 76 passes. This holding screw engages the adjustable member 66'.

The operation of this form of the invention is as follows:

When the leg is in a forwardly inclined position the pendulum 61'' depends and is located in a position in which the upper end 66' engages the tail projection 75 so that the tooth 72 engages the serrations 60'. The body may now be moved forwards and the stump engaging member 50 and the leg member 52 will be rigidly locked together. When the body reaches a position in which the artificial leg is disposed rearwardly, this position may be selected by a proper adjustment of the member 66', the pendulum 61' is iny a position in which the member 66' is free from the tail 75 so that the hook 73 moves downwards and the tooth 72 moves free of the serrations 60'. The artificial leg may now be bent and moved to its forward position. While it is being bent and moved forwards the leg ember 52 will always be inclined rearwardly, and for this reason the pendulum 61'' will not re-engage the tooth 72 with the serrations 60'. When the artificial leg is well to the front it is kicked straight, so that now the leg member 52 is extended forwardly and is substantially in a straight line with the stump engaging member 50. Then the pendulum 61'' re-engages the tooth 72 with the serrations 60', locking the parts together.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In an automatic knee lock, an adjustable length for an artificial leg, a stump engaging thigh member, having a hollow bottom end, a leg member having a hollow top end and set on to the bottom of said thigh member, a pintle mounted across the hollow of said thigh member, an adjustable support mounted within the hollow of said leg member and pivotally and slidably connected with said pintle, resilient means urging thigh member and leg member apart, a keeper adjustably mounted within the bottom of said thigh member and having an arcuate serrated bottom, a bolt slidably mounted on said leg member and engageable with said keeper by engaging said serrated bottom, a pendulum mounted within said leg member and having a cam for urging said bolt to engage said serrated bottom when said leg is in a straight condition and directed forwards, and said resilient means being adapted to give when weight is placed on said leg so that said serrated bottom engages said bolt for locking said thigh and leg member from pivoting.

2. In an automatic knee lock, an adjustable length for an artificial leg, a stump engaging thigh member, having a hollow bottom end, a leg member having a hollow top end and set on to the bottom of said thigh member, a pintle mounted across the hollow of said thigh member, an adjustable support mounted within the hollow of said leg member and pivotally and slidably connected with said pintle, resilient means urging thigh member and leg member apart, a keeper adjustably mounted within the bottom of said thigh member and having an arcuate serrated bottom, a bolt slidably mounted on said leg member and engageable with said keeper by engaging said serrated bottom, a pendulum mounted within said leg member and having a cam for urging said bolt to engage said serrated bottom when said leg is in a straight condition and directed forwards, and said resilient means being adapted to give when weight is placed on said leg so that said serrated bottom engages said bolt for locking said thigh and leg member from pivoting, said adjustable support comprising a pair of adjacent support sections with slots and clamp screws engaged through said slots for holding them in selected fixed positions.

3. In an automatic knee lock, an adjustable length for an artificial leg, a stump engaging thigh member, having a hollow bottom end, a leg member having a hollow top end and set on to the bottom of said thigh member, a pintle mounted across the hollow of said thigh member, an adjustable support mounted within the hollow of said leg member and pivotally and slidably connected with said pintle, resilient means urging thigh member and leg member apart, a keeper adjustably mounted within the bottom of said thigh member and having an arcuate serrated bottom, a bolt slidably mounted on said leg member and engageable with said keeper by engaging said serrated bottom, a pendulum mounted within said leg member and having a cam for urging said bolt to engage said serrated bottom when said leg is in a straight condition and directed forwards, and said resilient means being adapted to give when weight is placed on said leg so that said serrated bottom engages said bolt for locking said thigh and leg member from pivoting, said adjustable support being provided with a slot through which said pintle passes and comprising said slidable connection of the support and pintle.

4. In an automatic knee lock, an adjustable length for an artificial leg, a stump engaging thigh member, having a hollow bottom end, a leg member having a hollow top end and set on to the bottom of said thigh member, a pintle mounted across the hollow of said thigh member, an adjustable support mounted within the hollow of said leg member and pivotally and slidably connected with said pintle, resilient means urging thigh member and leg member apart, a keeper adjustably mounted within the bottom of said thigh member and having an arcuate serrated bottom, a bolt slidably mounted on said leg member and engageable with said keeper by engaging said serrated bottom, a pendulum mounted within said leg member and having a cam for urging said bolt to engage said serrated bottom when said leg is in a straight condition and directed forwards, and said resilient means being adapted to give when weight is placed on said leg so that said serrated bottom engages said bolt for locking said thigh and leg member from pivoting, said resilient means comprising springs acting between said support and pintle.

5. In an automatic knee lock, an adjustable length for an artificial leg, a stump engaging thigh member, having a hollow bottom end, a leg member having a hollow top end and set on to the bottom of said thigh member, a pintle mounted across the hollow of said thigh member, an adjustable support mounted within the hollow of said leg member and pivotally and slidably connected with said pintle, resilient means urging thigh member and leg member apart, a keeper adjustably mounted within the bottom of said thigh member and having an arcuate serrated bottom, a bolt slidably mounted on said leg member and engageable with said keeper by engaging said serrated bottom, a pendulum mounted within said leg member and having a cam for urging said bolt to engage said serrated bottom when said leg is in a straight condition and directed forwards, and said resilient means being adapted to give when weight is placed on said leg so that said serrated bottom engages said bolt for locking said thigh and leg member from pivoting, said keeper being provided with a slot, and a fastening screw engaged through said slot by which said keeper may be adjusted.

6. In an automatic knee lock, an adjustable length for an artificial leg, a stump engaging thigh member, having a hollow bottom end, a leg member having a hollow top end and set on to the bottom of said thigh member, a pintle mounted across the hollow of said thigh member, an adjustable support mounted with the hollow of said leg member and pivotally and slidably connected with said pintle, resilient means urging thigh member and leg member apart, a keeper adjustably mounted within the bottom of said thigh member and having an arcuate serrated bottom, a bolt slidably mounted on said leg member and engageable with said keeper by engaging said serrated bottom, a pendulum mounted within said leg member and having a cam for urging said bolt to engage said serrated bottom when said leg is in a straight condition and directed forwards, and said resilient means being adapted to give when weight is placed on said leg so that said serrated bottom engages said bolt for locking said thigh and leg member from pivoting, said bolt being provided with a flange engageable with a stationary member to limit its retracted position.

7. In an automatic knee lock, an adjustable length for an artificial leg, a stump engaging thigh member, having a hollow bottom end, a leg member having a hollow top end and set on to the bottom of said thigh member, a pintle mounted across the hollow of said thigh member, an adjustable support mounted within the hollow of said leg member and pivotally and slidably connected with said pintle, resilient means urging thigh member and leg member apart, a keeper adjustably mounted within the bottom of said thigh member and having an arcuate serrated bottom, a bolt slidably mounted on said leg member and engageable with said keeper by engaging said serrated bottom, a pendulum mounted within said leg member and having a cam for urging said bolt to engage said serrated bottom when said leg is in a straight condition and directed forwards, and said resilient means being adapted to give when weight is placed on said leg so that said serrated bottom engages said bolt for locking said thigh and leg member from pivoting, said pendulum having a bottom tubular portion loaded with shot.

8. An automatic knee lock, comprising a stump engaging thigh member having a hollow bottom end, a leg member having a hollow top end and set onto and overlapping the bottom end of said thigh member, a pintle extended across said overlapping portions pivotally connecting said members together, an elongated member having one end concentrically engaging said pintle and its other end attached to said leg member and formed with a keeper opening adjacent said pintle, a disc concentrically engaging said pintle and secured to said thigh member and formed with serrations, and a pendulum mounted on said stump member and having a bolt for simultaneously engaging said keeper opening and serrations when said leg is in a straight condition for locking said members against pivoting.

9. An automatic knee lock, comprising a stump engaging thigh member having a hollow bottom end, a leg member having a hollow top end and set onto and overlapping the bottom end of said thigh member, a pintle extended across said overlapping portions pivotally connecting said members together, an elongated member having one end concentrically engaging said pintle and its other end attached to said leg member and formed with a keeper opening adjacent said pintle, a disc concentrically engaging said pintle and secured to said thigh member and formed with serrations, and a pendulum mounted on said stump member and having a bolt for simultaneously engaging said keeper opening and serrations when said leg is in a straight condition for locking said members against pivoting, said pendulum comprising a pendulum arm mounted intermediate of its ends upon said stump engaging member, and a weight mounted on the bottom end of said arm.

10. An automatic knee lock, comprising a stump engaging thigh member having a hollow bottom end, a leg member having a hollow top end and set onto and overlapping the bottom end of said thigh member, a pintle extended across said overlapping portions pivotally connecting said members together, an elongated member having one end concentrically engaging said pintle and its other end attached to said leg member and formed with a keeper opening adjacent said pintle, a disc concentrically engaging said pintle and secured to said thigh member and formed with serrations, and a pendulum mounted on said stump member and having a bolt for simultaneously engaging said keeper opening and serrations when said leg is in a straight condition for locking said members against pivoting, said pendulum comprising a pendulum arm mounted intermediate of its ends upon said stump engaging member, and a weight mounted on the bottom end of said arm, said bolt being formed on the top end of said arm.

11. An automatic knee lock, comprising a stump engaging thigh member, a leg member having a hollow top end receiving an overlapping bottom end of said thigh member, strips pivotally connecting said leg member and thigh member, a serrated plate attached to the bottom portion of the thigh member, a hook pivotally attached at one of its ends on said leg member, said hook including a tooth and at its other end having a downward projection adapted to cam said tooth position into engagement with the said serration member, and a pendulum for controlling said camming action.

12. An automatic knee lock, comprising a stump engaging thigh member, a leg member having a hollow top end receiving an overlapping bottom end of said thigh member, strips pivotally connecting the said leg member and thigh member, a serrated plate attached to the bottom position of the thigh member, a hook pivotally attached at one of its ends on said leg member, said hook including a tooth and at the other end having a downward projection adapted to cam said tooth portion into engagement with the said serration member, and an adjustable pendulum for controlling said camming action, said pendulum being pivotally engaged within the upper portion of the leg member, in alignment with the said projection.

13. An artificial leg, comprising a stump engaging thigh member, a leg member having a hollow top end and set onto the bottom end of said thigh member, a pintle pivotally connecting the adjacent ends of said thigh member and leg member, lock means for locking said members fixedly together, and a pendulum pivotally mounted within the hollow top end of said leg member for operating said lock means to lock said members together in the forwardly directed position of said leg.

14. In an artificial limb, a leg member having a hollow top end, a thigh member having a hollow lower end, means pivotally connecting the upper end of said leg member and the lower end of said thigh member, a lock member fixedly secured to one of said members, a second lock member movably mounted on the other of said members and engageable with said first-mentioned lock member to lock said members fixedly together, a pivot mounted on said other member within the confines of the hollow end of such member, and a gravity operated swinging member movably mounted on said pivot for operating said second lock member to lock said leg and thigh members together in the forwardly directed position of said limb.

15. In an artificial limb, a leg member having a hollow top end, a thigh member having a hollow lower end, means pivotally connecting the upper end of said leg member and the lower end of said thigh member, and means for automatiallc locking said members together comprising a lock member fixedly secured to one of said members adjacent to the latter's connection with said other member, a pivot mounted in fixed position on the wall defining the hollow end of said other member and adjacent to such connection of said members, and a pendulum-like member movably mounted on said pivot and including a locking element engageable with said lock member to lock said members together and a gravity operated swinging element for bringing said locking element into locking engagement with said locking member in the forwardly directed position of said limb.

16. In an artificial limb, a leg member, a thigh member, means pivotally connecting adjacent ends of said leg member and thigh member, a lock member fixedly secured to one of said members, a second lock member movably mounted on the other of said members and engageable with said first-mentioned lock member to lock said members fixedly together, a pivot mounted on said other member, and a pendulum-like member movably mounted on said pivot and including a cam element engageable with said second lock member and a gravity operated swinging element for causing said cam element to move said second lock member into locking engagement with said first-mentioned lock member in the forwardly directly position of said limb.

17. In an artificial limb, a leg member, a thigh member, means pivotally connecting adjacent ends of said leg member and thigh member, a plate fixedly secured to one of said members and having a locking notch extending inwardly from an edge thereof, a latch member movably mounted on the other of said members and engageable with the notch of said plate to lock said members fixedly together, a pivot mounted on said other member and a gravity operated swinging member movably mounted on said pivot for operating said latch member to lock said leg and thigh together in the forwardly directed position of said limb.

GEORGE A. HINKLE.

REFERENCES CITED

The following references are of record in the file of this patent:

UNITED STATES PATENTS

| Number | Name | Date |
|---|---|---|
| 1,447,230 | Winn | Mar. 6, 1923 |
| 688,936 | Devol | Dec. 17, 1901 |
| 598,458 | Woodland | Feb. 1, 1898 |

FOREIGN PATENTS

| Number | Country | Date |
|---|---|---|
| 512,980 | Germany | Nov. 20, 1930 |
| 606,940 | France | Mar. 20, 1926 |